United States Patent [19]

White et al.

[11] 4,106,268
[45] Aug. 15, 1978

[54] METHOD FOR LOADING AND BALING CROP MATERIAL

[75] Inventors: Allen A. White, Peabody; Cecil L. Case, Newton; Thomas W. Ankenman, Hesston; George Yatcilla, Newton, all of Kans.

[73] Assignee: Hesston Corporation, Hesston, Kans.

[21] Appl. No.: 737,472

[22] Filed: Nov. 1, 1976

[51] Int. Cl.² ............................................. A01D 91/00
[52] U.S. Cl. ..................................... 56/1; 56/DIG. 2; 56/341; 100/70 R; 100/2
[58] Field of Search ............................. 56/1, 341–343, 56/DIG. 2; 100/50, 2, 3, 77, 70 R

[56] References Cited

U.S. PATENT DOCUMENTS

| | | | |
|---|---|---|---|
| 703,470 | 7/1902 | Rembert | 100/77 X |
| 2,909,887 | 10/1959 | Claas | 56/341 |
| 3,552,109 | 1/1971 | Murray et al. | 56/343 |
| 4,011,711 | 3/1977 | Mast | 56/341 |

*Primary Examiner*—Russell R. Kinsey
*Attorney, Agent, or Firm*—Schmidt, Johnson, Hovey & Williams

[57] ABSTRACT

In a baling operation that uses a continuously reciprocating plunger, if the next charge to be stuffed into the chamber has not yet reached the desired size and density by the time the stuffing fork is ready to begin its next operating cycle, the fork is temporarily deactivated, without affecting the plunger, until the charge reaches full size and density. Thereupon, the fork stuffs the entire charge into the baling chamber in a single cycle of operation for compaction by the plunger. The baler is loaded from the bottom of the baling chamber through an upwardly curved duct that serves both as an accumulating chamber and as a precompression area into which the charge is progressively packed by a rotating, retractable finger drum at the lower end of the duct. A backstop for precompression purposes may be presented at the top of the duct in a number of alternative ways, i.e., the moving plunger itself may be of such length as to cover the duct during a large portion of its stroke; the stuffing fork may be stopped at a position within and extending across the duct; or an auxiliary device may be rocked into and out of the duct in timed relation to operation of the fork.

5 Claims, 9 Drawing Figures

METHOD FOR LOADING AND BALING CROP MATERIAL

This invention relates to balers of the type described and claimed in co-pending applications for U.S. Patent Ser. No. 675,475, now U.S. Pat. No. 4,034,543 filed Apr. 9, 1976, in the names of VOTH, et al, and titled "CROP DENSITY SENSING MECHANISM FOR BALER LOADING APPARATUS", and Ser. No. 675,529, filed Apr. 9, 1976, in the name of ALLEN WHITE, and titled "BALER LOADING METHOD AND APPARATUS." The foregoing applications and the present invention are commonly owned by the assignee of the present invention.

The aforesaid applications relate at least in part to a major breakthrough in the "packaging" of hay and other crop materials. White the principles described and claimed in the applications have utility in the production of small bales on the order of 60 to 100 pounds, they have perhaps the greatest impact in the preparation of massive, highly dense bales on the order of 1 ton or more. As was pointed out in the applications, a principal obstacle in the production of such bales involves the inability of conventional mowing, raking, conditioning and windrowing equipment to prepare sufficiently voluminous and uniform windrows that the spacious baling chamber of the machine making the large bales can be loaded with uniformly dense, precisely sized charges that occupy the entire charging space of the chamber.

One way of overcoming this obstacle, as explained in the aforesaid applications, is to interrupt the otherwise continuously repetitious loading and compacting cycles long enough to accumulate a supply or charge of material that precisely meets the predetermined standards for such charges. Only after precisely the proper charge has been accumulated in an auxiliary chamber of the machine is that charge then briskly stuffed into the bale chamber by the reactivated loader and compacted against previously loaded material by the re-energized plunger.

Temporarily halting both the plunger and the loader while pickup and accumulation of a perfect charge continue on a non-stop basis becomes progressively more difficult as the operating speeds of the plunger and loader are increased in order, for example, to increase the capacity of the machine. Starting and stopping the plunger with its great mass in a suitably abrupt manner can severely tax the clutching apparatus used to effect such stopping and starting, and thereby contribute to the early failure of such mechanical components.

On the other hand, the concept of accumulating picked up crop material until such time as a perfectly shaped and uniformly dense charge is obtained and only then stuffing the same into the bale chamber remains an extremely attractive and viable solution to the aforementioned problems of windrow size and consistency. Accordingly, one important object of the present invention is to offer an alternative to clutching both the plunger and the loader through the provision of a method and apparatus that involves operating the plunger on a continuously reciprocating basis and clutching only the loader to temporarily deactivate the same if the charge accumulating during the preceding loading stroke does not meet predetermined standards of size and density. In other words, the present invention contemplates operating the plunger on a non-stop basis yet deactivating the loader to skip one or more plunger strokes until such time as the accumulating charge reaches the desired parameters of density and size, at which time the loader is reactivated in synchronism with the plunger.

Another important object of the present invention is to provide for precompression of the accumulating charge prior to stuffing the same into the bale chamber notwithstanding the continuous reciprocation of the plunger. In this respect, alternative arrangements are provided for utilizing the continuously moving plunger itself as a backstop for such precompression, utilizing the stuffer-loader as a backstop by terminating its stroke while the latter remains at one end of the accumulation chamber, or inserting an auxiliary backstop device into the accumulating chamber in timed relationship to operation of the loader.

A still further important object of this invention is to provide a way of maintaining reciprocation of the plunger, operation of the loader and actuation of the auxiliary backstop device all in properly timed relationship to one another notwithstanding the continuous operation of certain of the components and the intermittent operation of others.

Figure 4:
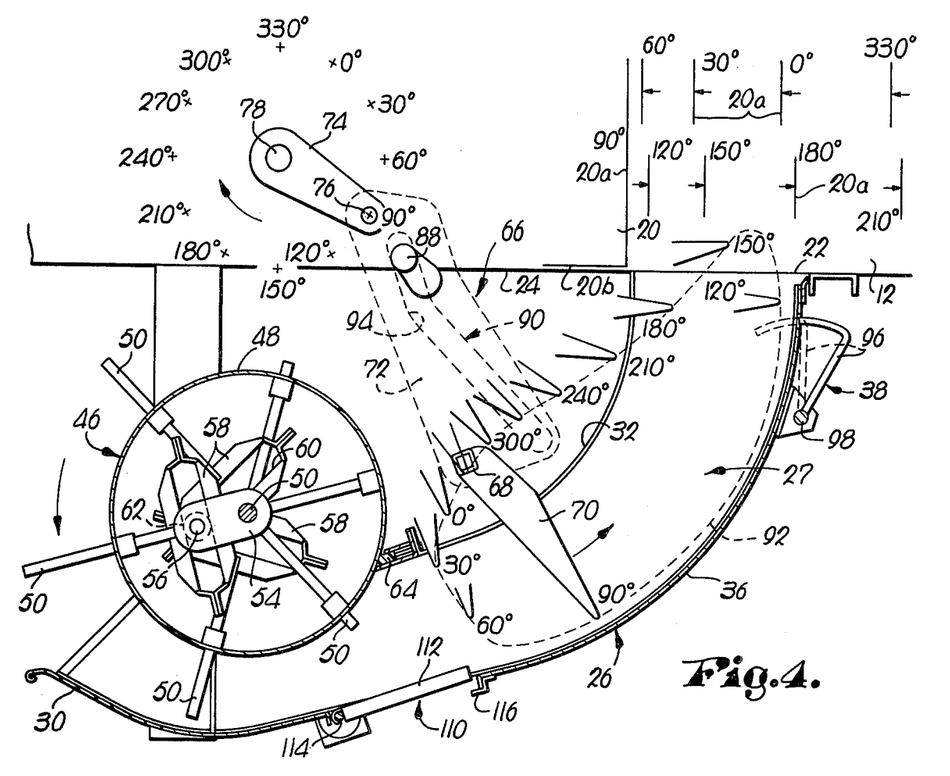
FIG. 4 is an enlarged diagrammatic view of the loader and its associated apparatus illustrating the relationship between the same at various stages in the loading and baling cycles.
Figure 7:
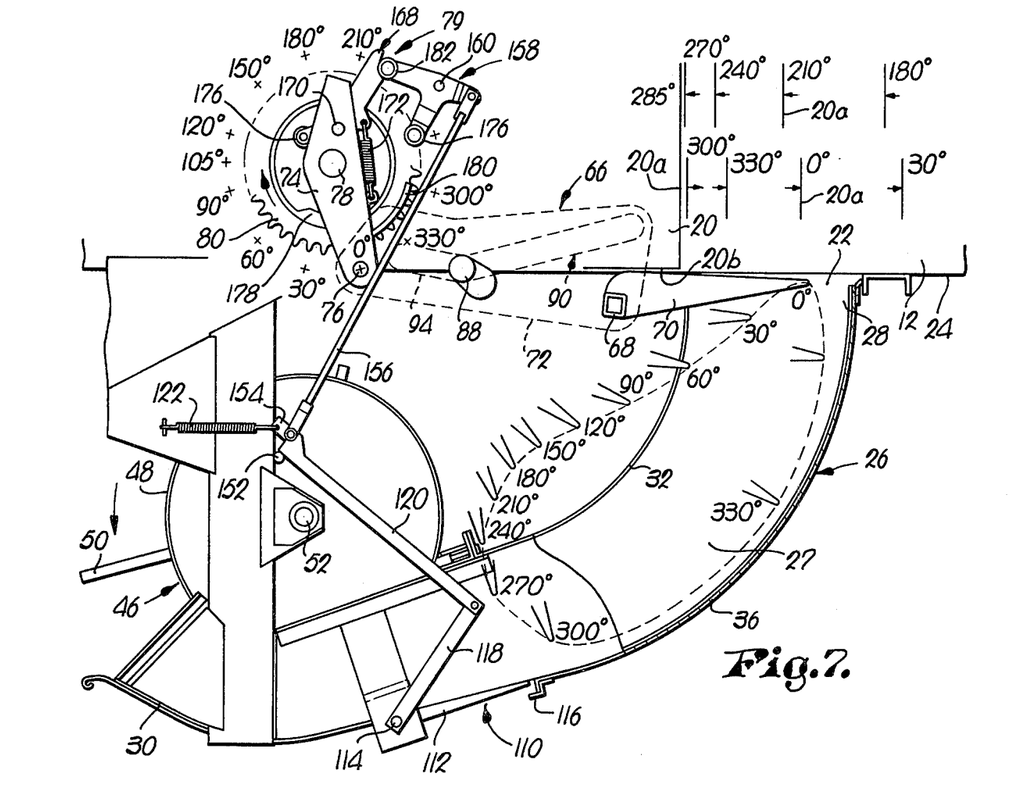
FIG. 7 is a diagrammatic view somewhat similar to FIG. 4, but illustrating an alternative arrangement for stopping the fork of the loader within the loading duct to serve as a backstop for precompression of accumulating material.

The baler has a long fore-and-aft extending bale case 10 of rectangular cross section that defines a baling chamber denoted by the numeral 12 in FIGS. 4 and 7. The bale case 10 is supported in a slightly upwardly and forwardly inclined manner by struts 14 having ground-engaging wheels 16 at their lowermost ends, and a downwardly and forwardly projecting tongue 18 at the front of the bale case 10 is adapted for hitching the baler to a towing vehicle (not shown) for advancing the same across a field. An enclosed plunger 20 reciprocates continuously fore-and-aft within chamber 12 for compacting material presented to the chamber 12 through an inlet 22 in the floor 24 of bale case 10 across the full width thereof.

An upwardly curved loading duct 26 depends from the bale case 10 and has its upper discharge end 28 in registration with the inlet 22, while the lower receiving end 30 of the duct is remote from inlet 22 and is disposed substantially forwardly thereof. Duct 26 flares outwardly in a fore-and-aft direction as its upper end 28 is approached and defines a slightly wedge-shaped chamber 27. The curved top wall 32 of the duct 26 is provided with laterally spaced, longitudinal slots 34 extending the full length thereof, while the curved bottom wall 36 of the duct 26 is solid over its entire length except for the area immediately adjacent the bale case 10 which is longitudinally slotted to accommodate an auxiliary backstop device 38 yet to be described.

The lower end 30 of the duct 26 is positioned directly behind a crop pickup 40 which may be of any design capable of picking up windrowed materials from the field and delivering the same rearwardly into the duct 26. In the illustrated embodiment, the pickup 40 has a series of lifting tines 42 that sweep the crop upwardly to an overhead auger 44 which gathers the crop centrally and delivers it rearwardly into the end 30 of the duct 26.

A rotary packer 46 is located between the pickup 40 and the duct 26 and across end 30 of the latter for making a precompressed charge of material within the duct 26 preparatory to loading the baling chamber 12. As illustrated, the top wall 32 of duct 26 terminates in rearwardly spaced relationship to the forward termination of the bottom wall 36, and the fore-and-aft space defined between such forward terminations is occupied by the packer 46. The latter includes a hollow drum 48 that is supported for rotation above the bottom wall 36 in the area of its upward curvature adjacent end 30, but the vertical distance between the bottom wall 36 and the periphery of the drum 48 at that location is substantially less than the corresponding dimension of the duct 26 throughout the remainder of its length of the bale case 10. Accordingly, the collecting chamber 27 of the duct 26 is constricted in the area immediately below the packer 46 which enables the rear periphery of the drum 48 to prevent retrograde movement of the material being packed into chamber 27 as will subsequently become clear.

Figure 5:
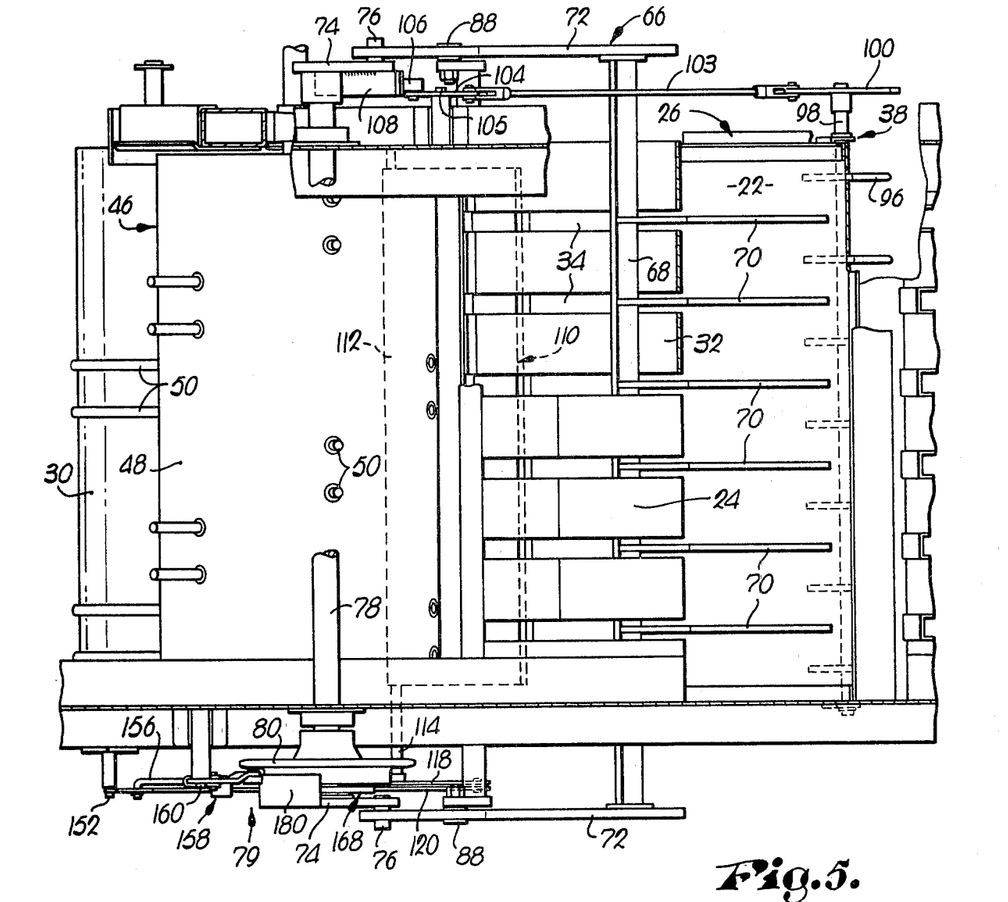
FIG. 5 is an enlarged, substantially horizontal cross-sectional view of the loader and its associated apparatus looking downwardly from a position just below the bale case of the machine, the stuffing forks of the loader being illustrated in the 120° position of FIG. 4.

The packer 46 also includes a plurality of crop-engaging fingers 50 which project radially from the axis of rotation of drum 48 and are disposed about the latter in relatively closely spaced pairs as illustrated in FIG. 5. To carry out the desired packing action and yet effectively withdraw from the crop materials, the fingers 50 are mounted within the drum 48 in such a way as to be extended as the drum 48 rotates down into the crop and retracted as the drum rotates up and out of the crop past the top wall 32 of duct 26. This action per se is not new and may be accomplished using mechanism such as described in U.S. Pat. No. 2,748,921, owned by the assignee of the present invention. Briefly, for purposes of a full understanding of the present invention, suffice it to say that the mechanism for extending and retracting the fingers 50 includes a stationary shaft 52 extending the length of drum 48 in coaxial relationship therewith. A pair of stationary cranks 54 (one only being shown) at opposite ends of the shaft 52 are rigidly affixed to the latter and cooperate to support a second shaft 56 in radially spaced, parallel relationship with the shaft 52. Spaced along the shaft 56 are a number of elongated mounts 58, each of which has a longitudinal trackway 60 within which a roller 62 on shaft 56 can operate, and each of the mounts 58 carries two oppositely extending pairs of the fingers 50. Thus, when the drum 48 is rotated, the fingers 50 and mounts 58 are carried around the axis of shaft 56 which, by its eccentric relationship to the axis of rotation of the drum 48, causes the mounts 58 to move back and forth on rollers 62 and thereby retract and extend the fingers 50, respectively.

An elongated scraper blade 64, mounted on the top wall 32, extends across the full width of the duct 26 in close proximity to the periphery of drum 48 for wiping crop material which might otherwise cling to the drum 48 during its rotation past the top wall 32. Note that inasmuch as fingers 50 are fully retracted as they sweep past top wall 32, they do not interfere with the blade 64 such that a truly effective crop-stripping action is obtained at that point.

Behind the packer 46 and above the loading duct 26 is located a stuffing fork 66 for periodically sweeping an accumulated charge into the baling chamber 12 from the duct 26. The fork 66 has a transverse square tube 68 spanning the duct 26 above the latter from which a series of laterally spaced-apart, elongated tines 70 depend. The tines 70 are spaced apart in accordance with the slots 34 in the top wall 32 of duct 26 such that tines 70 may enter chamber 27 through slots 34 and move along the duct 26 toward the bale case 10 during the loading cycle.

The fork 66 also includes a pair of levers 72 at opposite ends of the tube 68 that are mirror images of one another. Each lever 72 carries the tines 70 at its lower end and is rotatably coupled with a crank 74 at its upper end through a pivot 76. The cranks 74, in turn, are rigidly affixed to opposite ends of a drive shaft 78 that spans the bale case 10 above the packer 46. Shaft 78 is, in turn, controlled by a dog clutch 79 (to be described in detail below) on the left side of the bale case 10 that is associated with a large sprocket 80. The sprocket 80 receives driving power from an endless chain 82 entrained around a drive sprocket 84 carried by a drive shaft 86. In this manner, the normally upper or operated end of each lever 72 is mounted for movement in a circular path of travel about the axis of shaft 78.

A pair of stationary fulcrums 88 for the levers 72 extend laterally outwardly from opposite sides of the bale case 10 and are received within corresponding longitudinally extending slots 90 of the levers 72. Thus, during rotation of the upper ends of levers 72 by cranks 74, the fork 66 is operated through a generally kidney-shaped path of travel 92 into, along and out of the duct 26, as illustrated in FIG. 4. Note that the path of travel 92 extends upwardly through inlet 22 and into the baling chamber 12 for a short distance such as to assure that the charge from duct 26 is fully loaded into the chamber 12 during each loading cycle. Note also that because the levers 72 are shifted along as well as turned about the fulcrums 88 during each revolution of the cranks 74 (compare FIGS. 1 and 2 with FIG. 4), the fulcrum points for the levers 72 are displaced accordingly. Therefore, a long lever arm is presented between the pivots 76 and fulcrums 88 when the levers 72 are in the standby positions of FIGS. 1 and 2, and a short lever arm is presented between pivots 76 and fulcrums 88 when levers 72 are fully into the duct 26 as illustrated in FIG. 4. Consequently, the upsweep or stuffing stroke of the fork 66 is considerably more rapid than the initial entry and final withdrawal strokes thereof. An obliquely extending leg 94 of each slot 90 adjacent the corresponding pivot 76 has the effect of retarding the upsweep of the fork 66 during its initial entry into the duct 26.

Returning now to the backstop device 38 mounted on the bottom wall 36 of duct 26 adjacent the latter's discharge end 28, such device 38 includes a series of hook-shaped fingers 96 spaced along and rigid to a common shaft 98 spanning the duct 26 behind the latter. The shaft 98 is supported by the duct 26 for rotation about its longitudinal axis so as to swing the fingers 96 into and out of the chamber 27, as illustrated best in FIGS. 4 and 5. An operating crank 100 fixed to the right end of shaft 98 has a tension spring 102 (FIG. 2) connected thereto for the purpose of yieldably biasing the fingers 96 into the chamber 27. As slso shown in FIG. 2, the operating crank 100 of the shaft 98 is mounted on the latter intermediate the ends of the crank 100, and its end remote from the spring 102 is pivotally attached to a link 103 that extends upwardly and forwardly to pivotally connect to the rear of a rocker 104. The rocker 104 is horizontally pivoted at 105 to the right side of the bale case 10 and carries a cam follower 106 at its forward end that is disposed for engagement with and operation by an arcuate cam 108 rigidly affixed to the inner face of the crank 74.

The cam 108 is so positioned on the crank 74 that as soon as the crank 74 begins counterclockwise rotation during activation of the stuffer 66, the follower 106 will be engaged to cause the fingers 96 to rock back out of the chamber 27 and to continue in such removed position until such time as the stuffer 66 has swept the accumulated charge up into the baling chamber 12, whereupon the spring 102 is allowed to return the fingers 96 to their position within the chamber 27.

The backstop 38 works in conjunction with a sensor 110 carried by the duct 26 somewhat adjacent the forward end 30 of the latter and more or less below the packer 46. The sensor 110 comprises a rectangular plate 112 which spans the duct 26 across the bottom thereof and is attached to the latter by pivot means 114 for movement through a short swinging arc between an innermost, standby position as illustrated in the figures and an outermost, operated position (not shown) against a stop 116. A crank 118 on the left side of the bale case 10 is fixed to the pivot means 114 for swinging movement therewith, and an upwardly and forwardly extending member 120 connected to the upper end of the crank 118 is yieldably biased upwardly and forwardly by a tension spring 122 such as to urge the plate 112 into the chamber 27 toward its standby position as illustrated.

By virtue of the backstop 38 serving to create back pressure within the chamber 27, the sensor 110 can be utilized to determine when the charge accumulating within chamber 27 has reached predetermined characteristics of density and size. In this respect, the resistance which the plate 112 exerts against being swung outwardly against the stop 116 determines the density level at which the sensor 110 will be "triggered," and it therefore becomes essential for the operator to coordinate the tension of spring 122 with the desired density of the charges to be stuffed into the baling case 10. Such triggering of the sensor 110 may be used simply to signal the operator that the desired density level has been achieved and that it is then time to manually engage the clutch 79 to activate the stuffer 66. On the other hand, such actuation of the stuffer 66 may be effected automatically in the manner now to be described.

Figure 1:
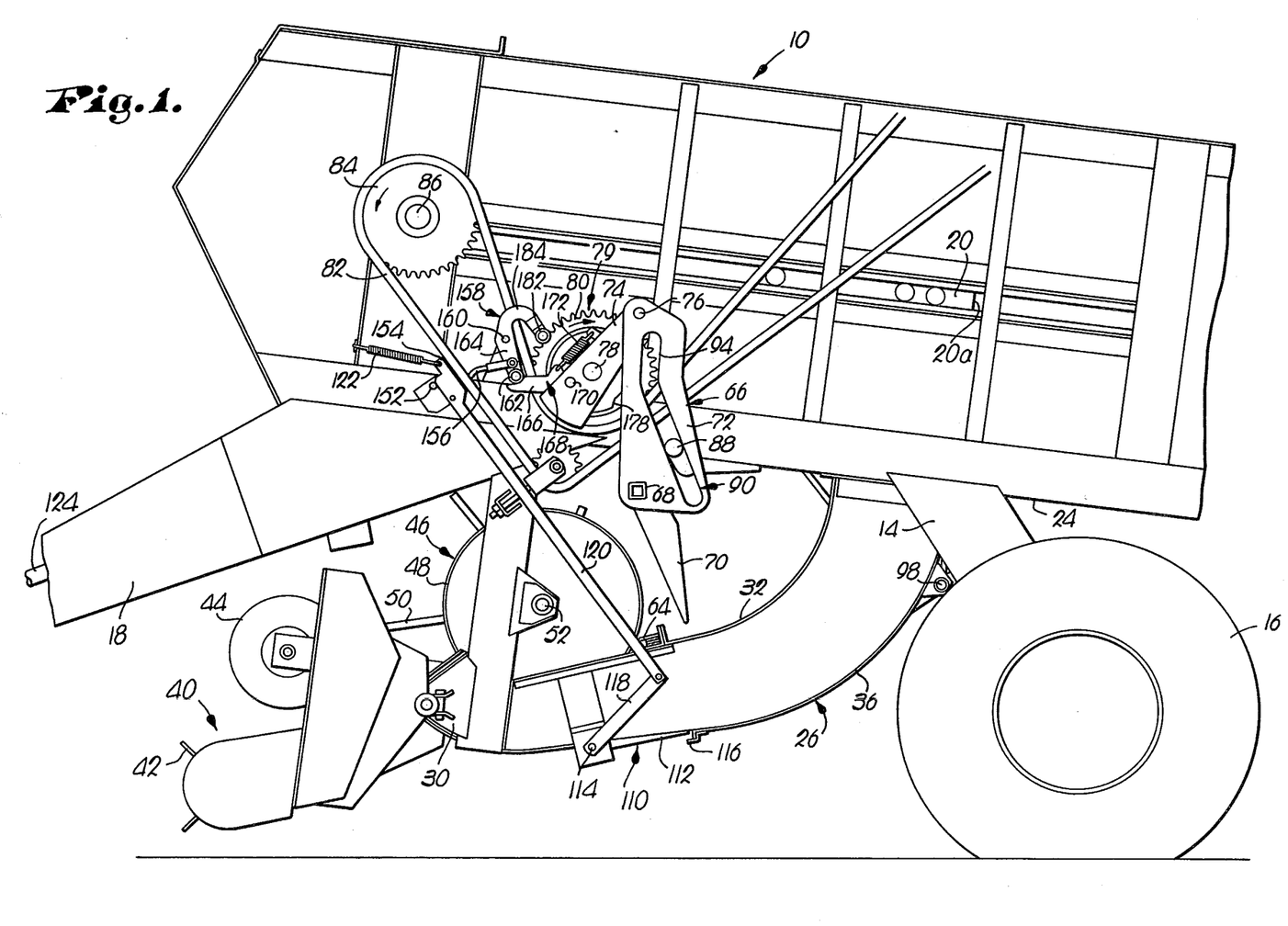
FIG. 1 is a fragmentary, elevational view of the left side of a baler constructed in accordance with the principles of the present invention and capable of carrying out our novel method.
Figure 2:
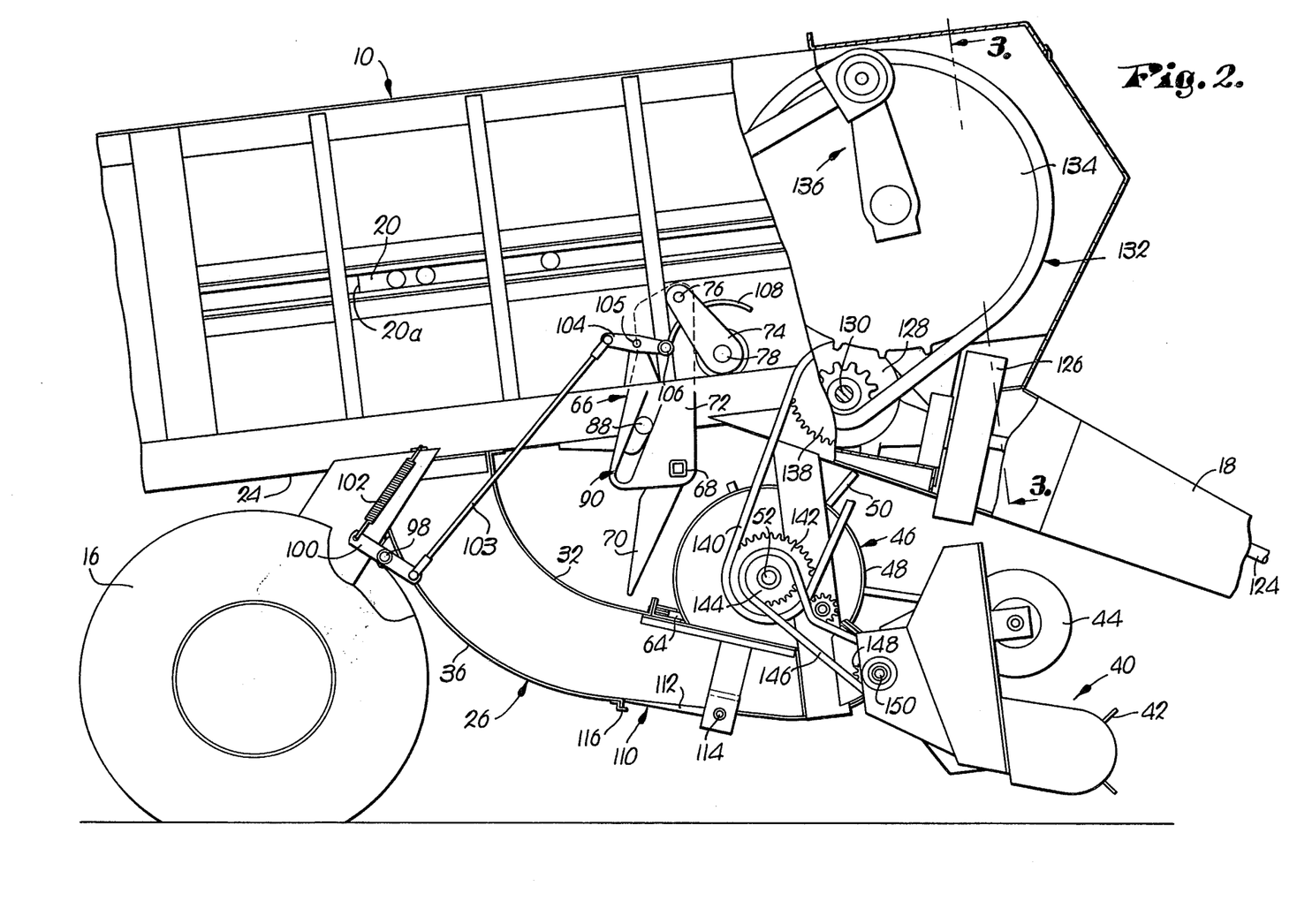
FIG. 2 is a fragmentary, elevational view of the right side thereof, parts being broken away and shown in cross section for clarity.
Figure 3:
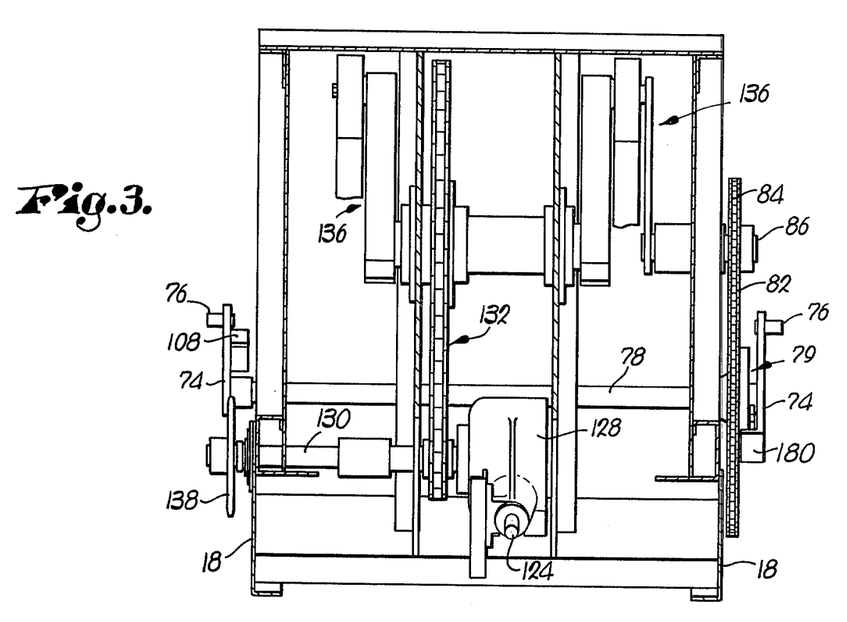
FIG. 3 is a sbustantially vertical cross-sectional view of the baler taken along line 3—3 of FIG. 2.

Power to drive the stuffer 66 is, as earlier mentioned, derived from the drive shaft 86 and its sprocket 84 on the left side of the bale case 10, as illustrated in FIG. 1. It is to be noted that, as illustrated in FIGS. 2 and 3, the shaft 86 is constantly rotating inasmuch as it is coupled directly to the main drive line 124 of the machine through a flywheel 126, a right angle gearbox 128 having an output shaft 130, a chain and sprocket assembly 132 that includes a very large sprocket 134, and crank and pitman assemblies 136 that reciprocate the plunger 20. Parenthetically, it should be further noted that the output shaft 130 from the gearbox 128 serves to drive the packer 46 and the pickup 40 through a first sprocket 138 carried by the shaft 130 on the right side of the bale case 10 and a drive chain 140 that entrains both the first sprocket 138 and a second sprocket 142 rigidly affixed to the shaft 52 of the packer 46. A third, smaller sprocket 144 on the shaft 52 is entrained by another chain 146 that extends downwardly and forwardly from the packer 46 to entrain a fourth sprocket 148 carried by a driven shaft 150 of the pickup 40.

Figure 6:
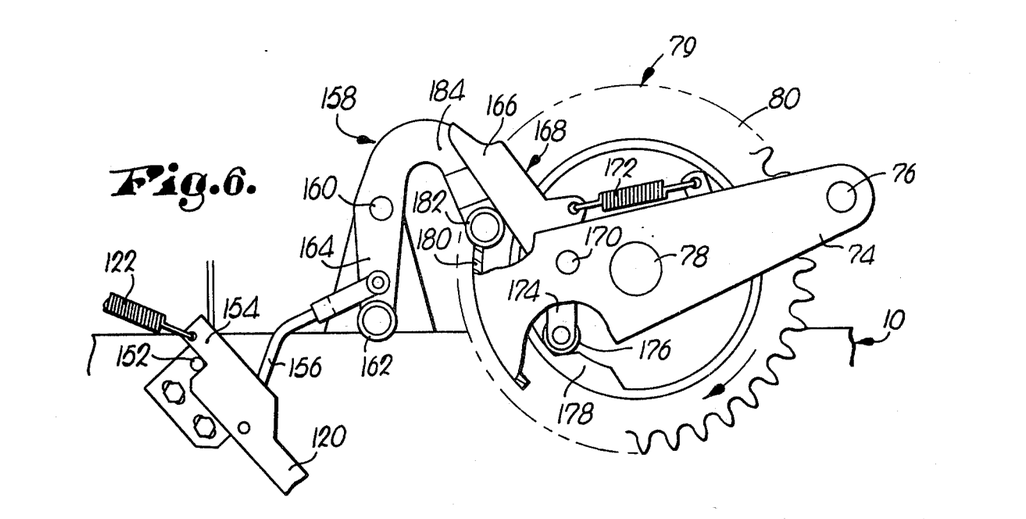
FIG. 6 is an enlarged, fragmentary elevational view of the clutch for the loader, the clutch being illustrated in a tripped or engaged position immediately following actuation of the loader.

The angle of pull of the tension spring 122 on the member 120 is such that the member 120 is urged toward a laterally projecting peg 152 adjacent the upper end of the member 120. When the sensor 110 is in its standby position, as illustrated in FIG. 1, the member 120 rides on the peg 152. However, when the sensor 110 has been triggered against the stop 116, such action pulls the member 120 downwardly and rearwardly so that it drops off the peg 152, as illustrated in FIG. 6, to the extent permitted by a limit block 154. A short, angled connector 156 transmits this motion from the member 120 to an inverted, generally U-shaped trigger 158 of the clutch 79 to rock the trigger 158 in a clockwise direction about a fixed pivot 160.

Prior to actuation in this manner, the trigger 158 is positioned as illustrated in FIG. 1 wherein it may be seen that a roller 162 on a downwardly extending leg 164 is in position to engage and block one arm 166 of a small bell crank 168 also forming a part of the clutch 79. The bell crank 168 is mounted on the crank 74 by a pivot 170, and a tension spring 172 yieldably biases the bell crank 168 in a clockwise direction viewing FIGS. 1 and 6. The opposite arm 174 of the bell crank 168 carries its own roller 176 that does not interfere with rotation of a shoulder 178 on the sprocket 80 when the bell crank 168 is rocked back to its standby position, as illustrated in FIG. 1. However, when the trigger 158 is operated by the member 120, as illustrated in FIG. 6, so as to pull the roller 162 out of the way of the arm 166 of bell crank 168, the roller 176 on the bell crank arm 174 becomes disposed within the path of travel of the shoulder 178. Accordingly, the next time that the shoulder 178 comes around to the roller 176, the stuffer drive shaft 78 will receive driving power from the drive line 124.

Inasmuch as it is desired to operate the stuffer 66 through but a single stuffing stroke during each cycle, it is necessary to reset the trigger 158 prior to a complete revolution of the sprocket 80. Accordingly, the crank 74 is provided with a reset cam 180 on the end thereof remote from the pivot 76, such cam 180 being of arcuate configuration and being disposed to engage a roller 182 on the opposite leg 184 shortly after the crank 74 begins rotation. Once the cam 180 has engaged the roller 182, further rotation of the crank 74 causes the trigger 158 to be rocked counterclockwise viewing FIG. 6 so as to once again position the roller 162 in alignment with the bell crank 168 when the latter complete its cycle. This motion also pulls the member 120 back up onto the peg 152 so that the sensor 110 is also reset.

OPERATION

As the baler is advanced, the pickup 40 continuously lifts crop material from the ground and feeds it rearwardly into the open end 30 of the duct 26 where it is packed upwardly and rearwardly into the accumulating chamber 27 by the packer 46. Assuming that the backstop 38 is inserted fully into chamber 27 at this time, the charge of material that begins to accumulate within the chamber 27 is engaged by the backstop 38 such that further upward travel toward the plunger 20 is resisted. This also has the effect of creating back pressure within the duct 26, and when that pressure reaches a predetermined level according to the desired density of the accumulating charge, the sensor 110 will be deflected downwardly against the stop 116 to pull the member 120 off the peg 152 and thereby engage the clutch 79 in the manner just above described. The stuffer 66 is thereby operated through a single stuffing cycle through the sequence illustrated in FIG. 4 to load the accumulated charge up into the bale case 10 from the duct 26.

As the stuffer 66 begins its charging stroke, the cam 108 on the crank 74 of the right side of the bale case 10 engages the follower 106 to cause the backstop 38 to be rocked back out of the chamber 27 so as to avoid interference with the up-moving charge and the forks 70. Once clearance has been provided, the backstop 38 is reintroduced into the chamber 27 by the return spring 102 as the cam 108 rotates on past the follower 106.

Reciprocation of the plunger 20 must be correlated with actuation of the stuffer 66 so that, regardless of the position of the plunger 20 at the time the sensor 110 is actuated, the plunger 20 and the stuffer 66 will operate in proper timed relationship to one another. This is achieved by the dog clutch 79 which allows a certain amount of dwell in the stuffer 66 if the plunger 20 is not in the proper position at the time the sensor 110 has been actuated. In this respect note that even though the trigger 158 may be actuated, the clutch 79 cannot be fully engaged until such time as the shoulder 178 comes around and bears against the roller 176 of the bell crank 168. The timing between the shoulder 178 and the roller 176 is such that the crop-engaging face 20a of the plunger 20 is in the position designated "0°" in FIG. 4 at such point in time, this corresponding as well to the "0°" point for the stuffer 66 in the same figure.

Note, then, in FIG. 4 that when the stuffer 66 is at its starting point, the plunger 20 is just barely covering the inlet 22. As the stuffer 66 moves through the first 60 degrees of its travel and enters the duct 26, the plunger 20 retracts to almost fully clear the inlet 22, whereupon the stuffer 66 moves quite quickly from 60° to 150° to flip the charge up into the chamber 12. Inasmuch as the plunger 20 begins moving rearwardly during such motion of the stuffer 66, and inasmuch as the forks 70 project up into the chamber 12 along the path of travel 92, the vertically slotted plunger 20 effectively wipes the charge off the forks 70 and continues rearwardly in its compression stroke. The stuffer then slowly returns to its originating position for the remainder of its 360° cycle.

The frequency of operation of the stuffer 66 depends entirely upon how quickly the duct 26 accumulates a charge having the predetermined desirable characteristics of size and density. If the machine is operating at full capacity such that a full charge is ready and waiting in the duct 26 at the beginning of each new plunger cycle, then the stuffer 66 will operate non-stop. On the other hand, if the windrow being picked up by the machine is so light and/or uneven that the accumulating charge does not come up to the desired parameters by the time the stuffer 66 has completed its cycle, then one or more plunger cycles may be skipped as required.

In effect, therefore, the operation of the baler may be described as including a check or measurement of the accumulated charge at the completion of each plunger cycle. If the charge is sufficiently dense, the sensor 110 will perceive this fact and either engage the clutch 79 or maintain it engaged so that the next plunger cycle will be accompanied by a stuffing cycle as well. On the other hand, if the sensor 110 perceives that the charge has not been sufficiently densified, then it causes the stuffer 66 to skip one or more plunger cycles as may be required.

ALTERNATIVE EMBODIMENTS

While the foregoing description relates to a preferred embodiment of the present invention, it is by no means the only possible embodiment thereof. For example, although not specifically illustrated in the figures, it is to be understood that one alternative embodiment of the present invention includes clutching the stuffer 66 in the above manner without stopping the plunger 20, but eliminating the use of the backstop 38. In such a situation, the bottom 20b of the plunger 20 (see FIG. 4) is utilized as a backstop of sorts, albeit a moving one, inasmuch as the bottom 20b closes the inlet 22 for much of the plunger cycle. This arrangement has the disadvantage, however, of the fact that the plunger bottom 20b cannot provide a source of back pressure for the charge during the time that the inlet 22 is uncovered, and, hence, the frictional resistance of the walls of the duct 26 must be relied upon during such times to induce back pressure. If such pressure is not sufficiently high during the time the inlet 22 is open, chances are that when it once again becomes closed by the bottom 20b of the plunger 20, sufficient back pressure will arise to actuate the sensor 110 and thereby engage the clutch 79.

Figure 8:
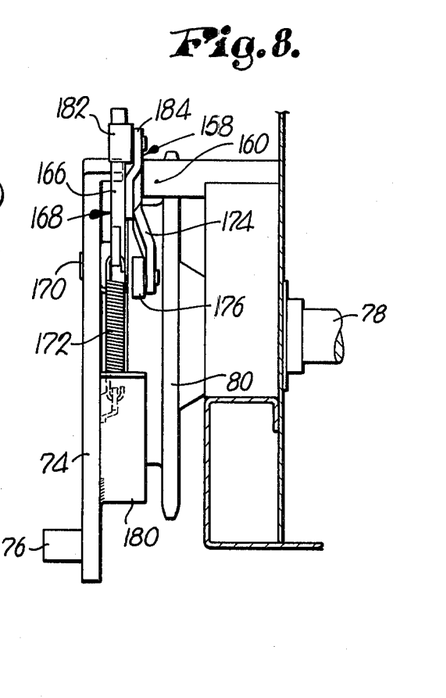
FIG. 8 is an edge elevational view of the clutch utilized in the arrangement of FIG. 7.
Figure 9:
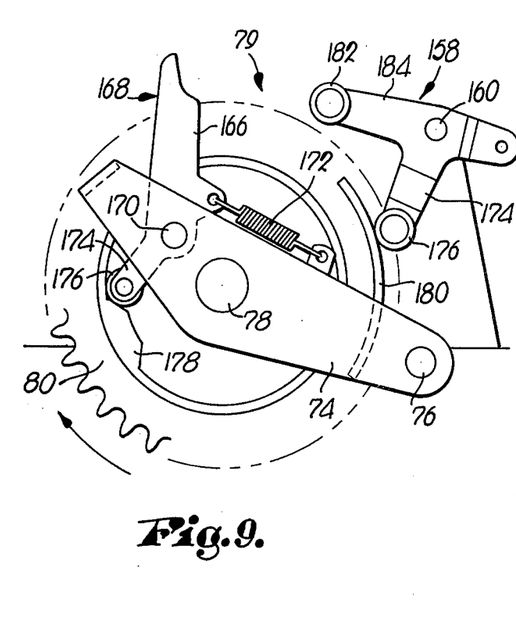
FIG. 9 is a side elevational view thereof illustrating the position of the clutch at a point fully within the operating cycle.

Another alternative embodiment is illustrated in FIGS. 7-9 which shows a way of using the forks 70 as a backstop in lieu of the previously described backstop device 38. In this arrangement, the various components are practically the same as in the first embodiment, but the fulcrum point for the stuffer 66 is shifted somewhat so that the forks 70 do not enter the bale case 10. Moreover, the timing of the clutch 79 is changed so that the forks 70 will come to rest within the duct 26 at the "0°" position illustrated in FIG. 7 if the clutch 79 is disengaged at the completion of a stuffing-compaction cycle. In addition, it will be noted that the trigger 158 is positioned at the rear of the clutch 79 instead of on the front side thereof as in the first embodiment. Also, the connector 156 is lengthened.

In other respects the operation of this embodiment is virtually the same as that of the first embodiment. If the charge accumulating within the chamber 27 has obtained the desired characteristics by the time the stuffer 66 has completed its 360° movement, then the clutch 79 will remain engaged so that the stuffer 66 will operate non-stop.

On the other hand, if the desired density has not yet been achieved within the duct 26 by the time the stuffer 66 nears the completion of its cycle, then the clutch 79 will be disengaged so as to leave the forks 70 positioned across the top of the duct 26, as illustrated in FIG. 7. This causes the forks 70 to serve as backstop means whereby to increase the back pressure within the charge and thereby encourage the sensor 110 to be actuated.

It is also to be noted that the reset cam 180 on the crank 74 is moved in this particular embodiment from its position with the first embodiment. As illustrated in FIGS. 7-9, the new position of the reset cam 180 is on that end of the crank 74 adjacent the pivot point 76, such relocation being necessary in view of the repositioning of the trigger 158. The operation of the reset cam 180 is precisely as earlier explained with regard to the first embodiment.

Having thus described the invention, what is claimed as new and desired to be secured by Letters Patent is:

1. In a method of baling a volume of material supplied at an irregular rate, the steps of:
   continuously reciprocating a compacting plunger in a baling chamber;
   stuffing successive charges of the material into the chamber in timed relation to reciprocation of the plunger and at the rate of one stuffing stroke per each cycle of the plunger;
   checking the size and density of the next charge before each stuffing stroke; and
   if the next charge has not yet reached a predetermined size and density, skipping one or more stuffing strokes relative to the continuously moving plunger until the desired size and density have been achieved.

2. In a baling method as claimed in claim 1, wherein said steps are carried out while the baling chamber is advancing; and the additional step of continuously picking up material from the ground for charging the chamber as the latter advances.

3. In a baling method as claimed in claim 1, and precompressing the next charge laterally against the moving plunger in an accumulating chamber before each stuffing stroke.

4. In a baling method as claimed in claim 1; and precompressing the next charge before each stuffing stroke in an accumulating chamber against structure which will subsequently stuff the charge into the baling chamber.

5. In a baling method as claimed in claim 1; and precompressing the next charge against a backstop in an accumulating chamber before each stuffing stroke and removing said backstop before stuffing the charge into the baling chamber.

* * * * *